US012000167B2

(12) United States Patent
Ellerbrock

(10) Patent No.: US 12,000,167 B2
(45) Date of Patent: Jun. 4, 2024

(54) EXPANDABLE FIRE FENCE WITH ADDITIONAL SAFETY FEATURES

(71) Applicant: Scott Ellerbrock, Ottawa, OH (US)

(72) Inventor: Scott Ellerbrock, Ottawa, OH (US)

( * ) Notice: Subject to any disclaimer, the term of this patent is extended or adjusted under 35 U.S.C. 154(b) by 64 days.

(21) Appl. No.: 17/460,501

(22) Filed: Aug. 30, 2021

(65) Prior Publication Data

US 2022/0268053 A1 Aug. 25, 2022

Related U.S. Application Data

(60) Provisional application No. 63/153,567, filed on Feb. 25, 2021.

(51) Int. Cl.
*E04H 17/18* (2006.01)
*A62C 3/02* (2006.01)

(52) U.S. Cl.
CPC ........... *E04H 17/18* (2013.01); *A62C 3/0257* (2013.01); *E04H 17/185* (2021.01)

(58) Field of Classification Search
CPC ....... E04H 17/18; E04H 17/185; F24B 1/191; F24B 1/192; F24B 1/181; F24C 15/36; A62C 3/0257
See application file for complete search history.

(56) References Cited

U.S. PATENT DOCUMENTS

| | | | | |
|---|---|---|---|---|
| 685,247 A * | 10/1901 | Borrman | E04H 17/063 | 256/72 |
| 936,812 A * | 10/1909 | Robinson | E06B 9/0661 | 160/136 |
| 2,348,561 A * | 5/1944 | Mutch | E06B 9/0623 | 160/145 |
| 6,092,792 A * | 7/2000 | Camara | E04H 15/003 | 256/25 |
| 6,425,387 B1 * | 7/2002 | Rohback, Jr. | F24C 3/14 | 126/152 A |
| 7,782,215 B1 * | 8/2010 | Knapp, Jr. | G08B 21/22 | 340/517 |
| 2010/0038612 A1 * | 2/2010 | Hazlett | E04H 17/161 | 256/65.02 |
| 2011/0049453 A1 * | 3/2011 | Anderson | E04H 17/08 | 256/1 |

(Continued)

*Primary Examiner* — Michael P Ferguson
(74) *Attorney, Agent, or Firm* — Brennan, Manna, & Diamond, LLC

(57) ABSTRACT

A portable and expandable fence system to provide a protective barrier around a campfire is disclosed. The fence system comprises a plurality of slats coupled together via a plurality of hinged connectors that allow the fire fence to be easily expanded and retracted in an accordion-like manner. In an expanded configuration, a first portion of the plurality of slats are substantially parallel to one another and a second portion of the plurality of slats are substantially parallel to one another, but positioned diagonally opposite to the first portion of slats. In a retracted configuration, the plurality of slats form a compacted cylindrically-shaped structure, wherein the plurality of slats are each relatively parallel to one another, substantially vertical in relation to the ground, and in contact with one another. In a preferred embodiment of the present invention, the system further comprises a plurality of additional safety features.

6 Claims, 5 Drawing Sheets

(56) References Cited

U.S. PATENT DOCUMENTS

| | | | | |
|---|---|---|---|---|
| 2011/0162280 | A1* | 7/2011 | Yu | H02S 20/00<br>49/34 |
| 2012/0112148 | A1* | 5/2012 | Hammond | A62C 99/00<br>256/25 |
| 2014/0361895 | A1* | 12/2014 | Smith | G08B 13/122<br>340/541 |
| 2018/0372324 | A1* | 12/2018 | Gamble | A45F 4/00 |
| 2019/0112834 | A1* | 4/2019 | Sinasac | E04H 17/18 |
| 2020/0182460 | A1* | 6/2020 | Bentley | F23D 14/725 |
| 2021/0123260 | A1* | 4/2021 | Thompson | E04H 17/18 |

* cited by examiner

EXPANDABLE FIRE FENCE WITH ADDITIONAL SAFETY FEATURES

CROSS-REFERENCE TO RELATED APPLICATION

The present application claims priority to, and the benefit of, U.S. Provisional Application No. 63/153,567, which was filed on Feb. 25, 2021 and is incorporated herein by reference in its entirety.

FIELD OF THE INVENTION

The present invention relates generally to the field of fences. More specifically, the present invention relates to a multipurpose bonfire fence that may be used to protect individuals and pets from getting too close to the fire. The fire fence of the present invention expands into a substantially circular configuration to surround an entire fire, and form a temporary barrier between the fire and the individuals or pets around the fire. The fire fence also includes a number of other safety features that alert the user and others when, for example, the fence has been disturbed or breached. Additionally, when not in use, the fire fence of the present invention may be compacted into a relatively tight cylinder that can be secured via a strap for easy storage and transportation. Accordingly, this disclosure makes specific reference thereto the present invention. Nonetheless, it is to be appreciated that aspects of the present invention are also equally applicable to other like applications, devices and methods of manufacture.

BACKGROUND OF THE INVENTION

By way of background, in many regions around the world, people enjoy a campfire or bonfire. Typically, such fires are open-air fires that may be used for warmth, signaling, cooking, socializing, burning rubbish, celebrating, etc. When such fires are created, individuals including children, adults, the elderly, pets, etc. may sit around the fire in a generally circular arrangement to enjoy the warmth of the fire and to engage in one or more of the above-described activities. Unfortunately, while enjoying the benefits of the fire, some individuals, especially young children, may get too close to the fire and become severely injured or burned. This is true because children may be unaware of just how hot and dangerous the fire is or can be, and may, as a result, suffer from serious injuries if they get too close thereto. Unfortunately, the same is true for pets, who may also get too close to an outdoor fire and end up with burnt hair and/or other serious injuries.

Accordingly, some individuals may attempt to create a temporary barrier around a fire by placing rocks or sticks along the perimeter of the fire. However, creating such a temporary barrier is a time consuming and laborious process, not only to create the temporary barrier but also to remove the same when it is no longer needed. For example, every time a campfire or bonfire is created, the individuals must first gather the materials necessary to create the barrier, which may not always be readily available. If materials are not readily available, the individual must transport to the fire the necessary materials, which are oftentimes dirty, heavy and consume vast amounts of space. Additionally, temporary barriers created from materials such as rocks, stones and sticks offer no additional safety measures, and may be easily knocked over or breached.

Therefore, there exists a long felt need in the art for a fire fence device for forming a temporary barrier between a campfire/bonfire and the individuals positioned around the fire, including adults, children, pets, etc., thereby protecting the same from becoming burned or otherwise seriously injured. Additionally, there is a long felt need in the art for a fire fence device that can be easily assembled and dismantled when no longer needed, and that does not necessitate the user having to scavenge for the necessary materials to construct the fire fence device each time. Moreover, there is a there is a long felt need in the art for a fire fence device that is both variable in size and highly portable, and that can be easily compacted when not in use for convenient transportation and storage. Further, there is a long felt need in the art for a fire fence device that has additional safety measures that alert a user and other individuals when the fire fence has been disturbed or otherwise breached. Finally, there is a long felt need in the art for a fire fence device that is relatively inexpensive to manufacture, and that is both safe and easy to use.

The subject matter disclosed and claimed herein, in one embodiment thereof, comprises a portable fence system designed to be expanded in a substantially circular orientation and that acts as a barrier to delineate an area. The fire fence device comprises a plurality of slats, coupled together via a plurality of hinged connectors, that allow the fire fence device to be easily expanded and retracted in an accordion-like manner. More specifically, the slats may be expanded or retracted using the hinged connectors, wherein, in the expanded form, a first half of the total number of slats are substantially parallel to one another, and a second half of the total number of slats are substantially parallel to one another, but positioned diagonally opposite to the first half of the slats. Similarly, in a retracted or closed position, the plurality of slats form a compacted cylindrically-shaped structure, wherein the plurality of slats are each relatively parallel to one another and substantially vertical and in contact with one another. In a preferred embodiment of the present invention, the fire fence device further comprises a plurality of additional safety features that alert the user and other individuals when the fire fence device has been disturbed or otherwise breached, as explained more fully below.

In this manner, the novel fire fence device of the present invention accomplishes all of the forgoing objectives, and provides a relatively safe, easy, convenient and efficient solution to forming a temporary barrier between a fire, such as a campfire or bonfire, and the individuals and pets positioned around it, thereby protecting the same from serious injury or even death. The fire fence device of the present invention is also user friendly inasmuch as it does not require the user to put much time and/or effort into assembling or dismantling the fence device, and because the same is easily compacted when not in use for easy and convenient storage and transportation.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises an easily deployable, expandable and generally circular fence system that is designed to create a temporary barrier between a campfire, bonfire or other restricted area and those individuals and pets adjacent to the same. The fire fence device comprises a plurality of slats, coupled together via a plurality of hinged connectors, that allow the fire fence device to be easily expanded and retracted in an accordion-like manner. In its expanded or deployed form, a first half of the total number of slats of the fire fence device are substantially parallel to one another, and the second half of the total number of slats are substantially parallel to one another but positioned diagonally opposite to the first half of the slats. Similarly, in a retracted or closed position, the plurality of slats form a compacted substantially cylindrically-shaped structure, wherein the plurality of slats are each relatively parallel to one another, substantially vertical and in contact with one another.

In a further embodiment of the present invention, a fire fence device designed to install around the perimeter of a bonfire, campfire, or other similar outdoor fire structure to prevent children, pets, and others from getting too close to the fire is disclosed. The fire fence device comprises a plurality of slats of substantially equal height, width and shape interconnected with one another via a plurality of hinged and repositionable connectors. More specifically, each slat has one or more pivot hinges along its length that connect said slat to a plurality of other slats, such that the fire fence device is configured to be expanded or retracted. During expansion, the plurality of slats are dimensioned in two different directions, namely a first direction and a second direction that is diagonally opposed to the first direction. Stated differently, a first set of slats are right-inclining members and a second set of slats are left-inclining members, wherein each right-inclining member crosses at least two left-inclining members in the expanded mode. In a retracted position, each of the plurality of slates are substantially parallel to one another and in contact with the slat immediately positioned on either side of said slat.

In yet a further embodiment of the present invention, the fire fence device further comprises a plurality of additional safety features that alert the user and other individuals when the fire fence device has been disturbed or otherwise breached. More specifically, the fire fence device may comprise one or more sensors, a speaker, wireless communication module and a battery for powering each of the sensors, the speaker and the wireless communication module. The sensors are capable of detecting a variety of parameters such as, but not limited to, a temperature and whether the fire fence device has been repositioned, disturbed or otherwise breached, and is in electrical communication with the speaker and/or the wireless communication module. If one or more of such parameters have been detected, the fire fence device may emit an alarm via the speaker to warn the user of the same and/or utilize the wireless communication module to send a wireless communication to a mobile application installed on the user's electronic device.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION

Figure 1:
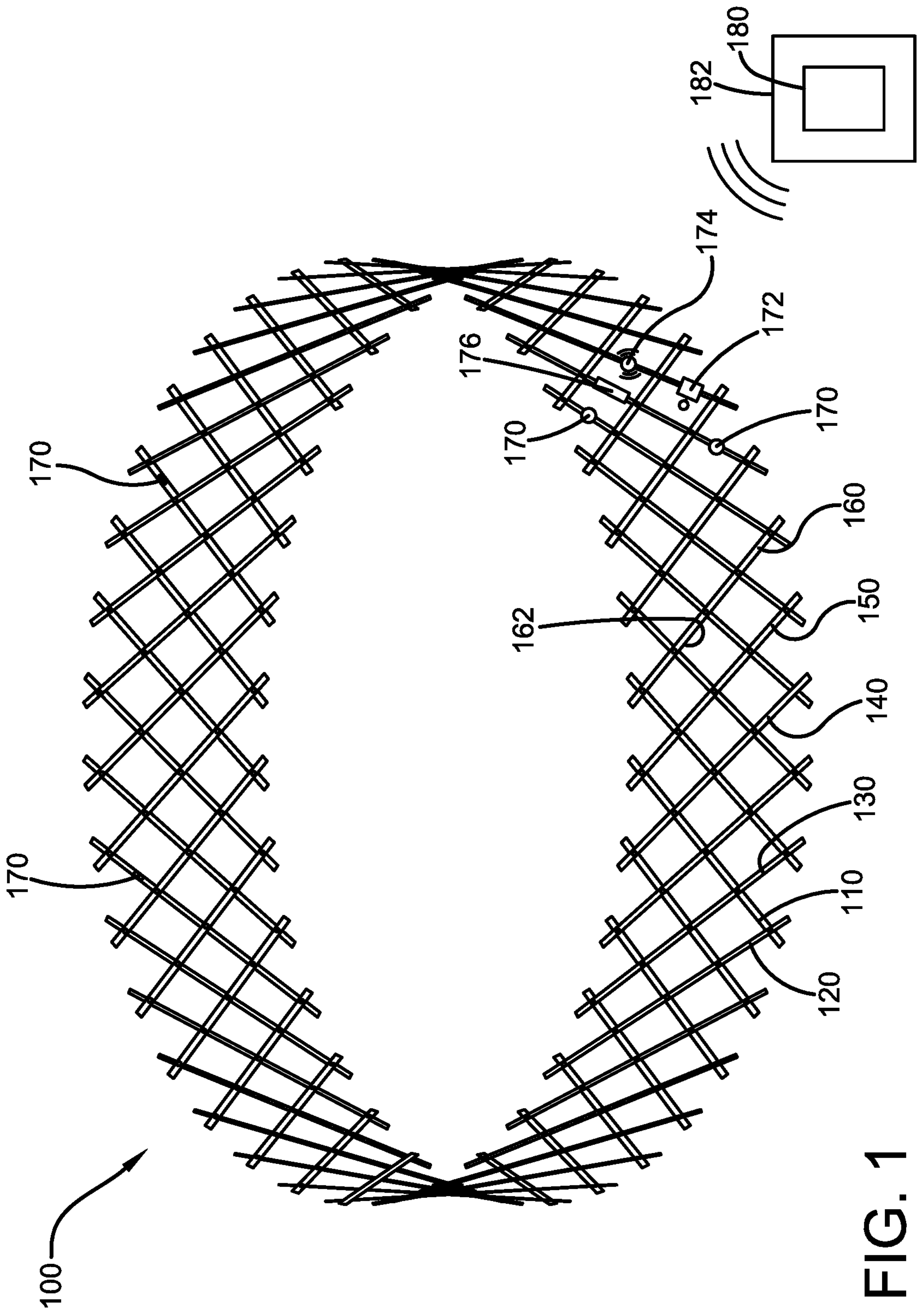
FIG. 1 illustrates a perspective view of one potential embodiment of the fire fence device of the present invention in an expanded condition in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long felt need in the art for a fire fence device that forms a temporary barrier between a campfire or bonfire and the individuals and pets positioned around the fire, thereby protecting the same from becoming burned or otherwise seriously injured. Additionally, there is a there is a long felt need in the art for a fire fence device that is both variable in size and highly portable, and that can be easily compacted when not in use for convenient transportation and storage. Moreover, there is a long felt need in the art for a fire fence device that can be easily assembled and dismantled when no longer needed, and that does not necessitate the user having to scavenge for the necessary materials to construct the fire fence device each time. Further, there is a long felt need in the art for a fire fence device that has additional safety measures that alert a user and other individuals when the fire fence has been disturbed or otherwise breached. Finally, there is a long felt need in the art for a fire fence device that is relatively inexpensive to manufacture, and that is both safe and easy to use.

Figure 3:
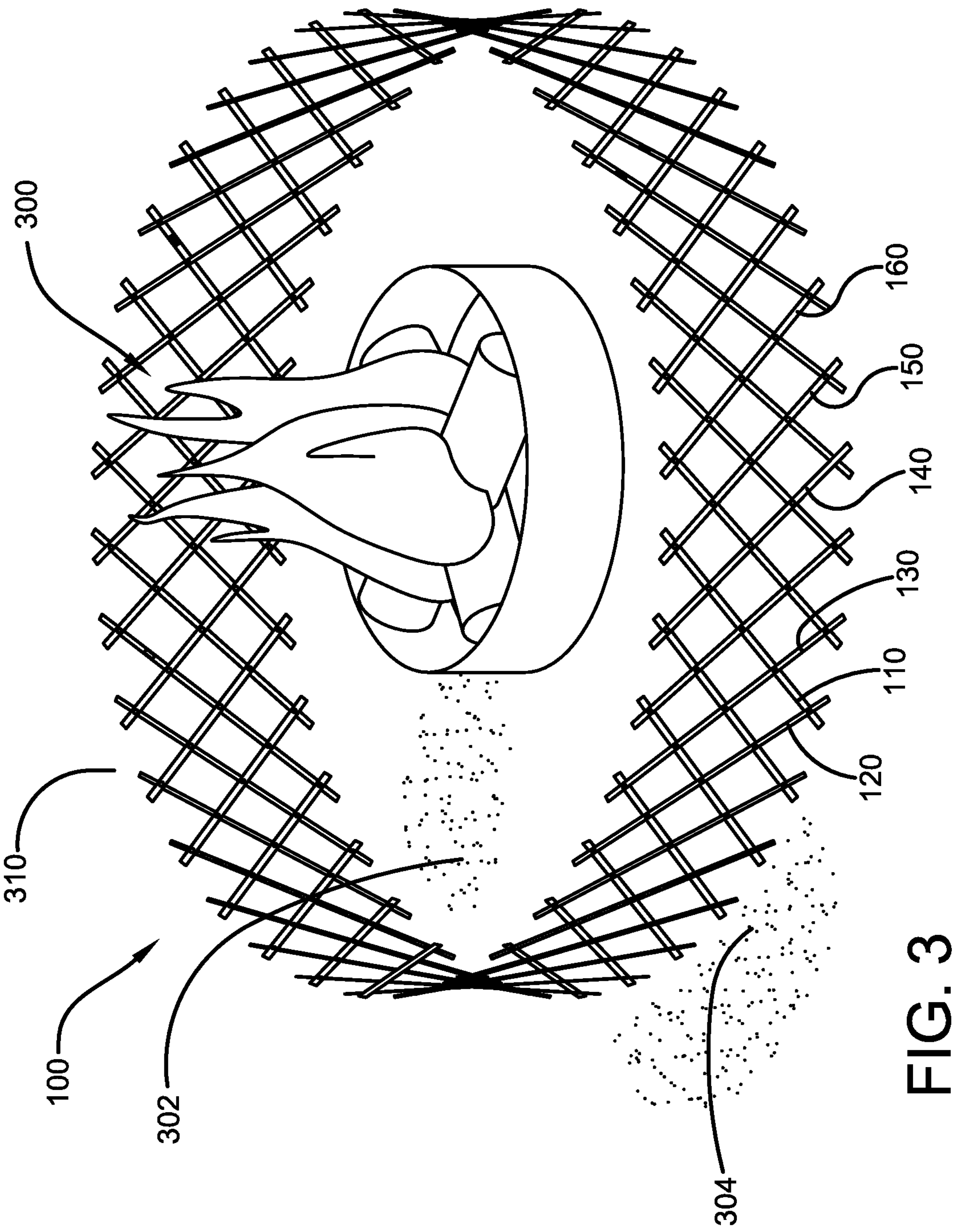
FIG. 3 illustrates a perspective view of one potential embodiment of the fire fence device of the present invention in an expanded condition around a campfire in accordance with the disclosed architecture.
Figure 5:
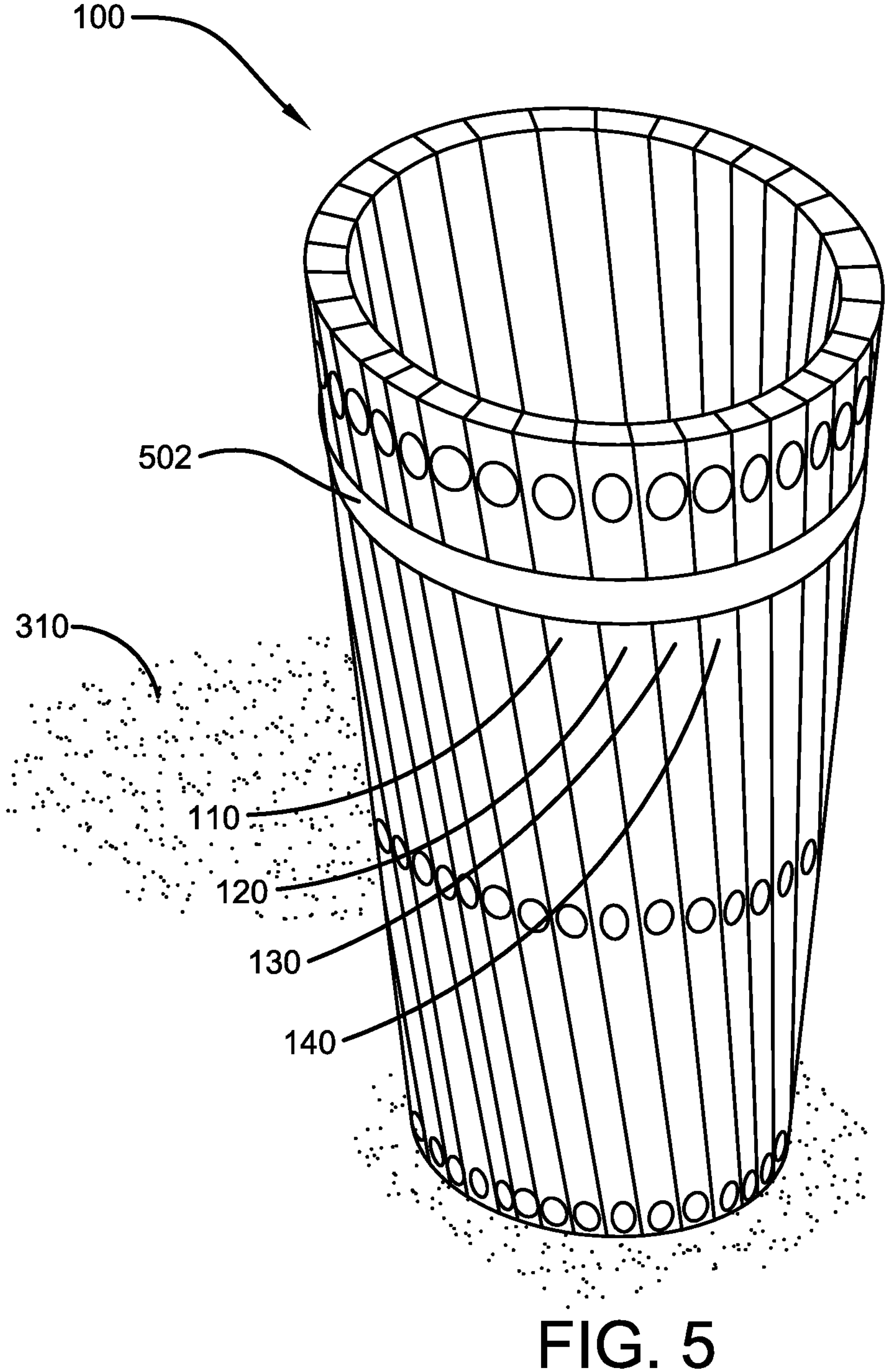
FIG. 5 illustrates a perspective view of one potential embodiment of the fire fence device of the present invention in a fully retracted or stowed condition in accordance with the disclosed architecture.

Referring initially to the drawings, FIG. 1 illustrates a perspective view of one potential embodiment of the fire fence device 100 of the present invention in an expanded condition in accordance with the disclosed architecture. More specifically, the fire fence 100 of the present invention is a collapsible fence that can be installed around a perimeter of a bonfire, campfire or other similar outdoor fire or any other structure. The fire fence 100 created a temporary barrier around an area in which entry is not desired, and protects individuals from accessing said area and, for example, getting too close to a fire. The fire fence 100 is easily repositionable between a fully-deployed position as best shown in FIGS. 1 and 3, a fully-collapsed or retracted position as best shown in FIG. 5, and anywhere in between to suit user need and/or preference, a particular application or a desired perimeter size.

The fire fence device 100 may be comprised of a relatively lightweight, weather-resistant and durable material such as, but not limited to, a wood, polymer, fiberglass, metal or heavy plastic. Nonetheless, the materials used to construct the fire fence device 100 should also be comprised of a heat/fire resistant/retardant material or coating so that the same is capable of withstanding the heat from the fire which it surrounds and does not itself catch fire or become hot to the touch. Further, the materials used may also be coated with various materials to protect the surfaces thereof from water, sun, grease, rust, dust, chemicals and more, and may also be painted in any color that suits user need and/or preference.

The fire fence device 100 is made up of a plurality of slats 110, 120, 130, 140, 150, 160, etc., which are hingedly interconnected to one another by a plurality of hinged connectors to create a scissor or accordion action latticed structure. In an expanded configuration (see e.g., FIGS. 1-3), the slats are positioned in two different directions or orientations forming two overlaid zig-zagging sets of slats. In an expanded position, the diameter of the fire fence 100 of the present invention is greater than the diameter of the fire fence 100 in a stowed position.

In the present embodiment, each of the slats 110, 120, 130, 140, 150, 160, etc. of the fire fence device 100 positioned in a first direction or orientation is comprised of five different hinged points or connections with slats positioned in a second direction or orientation. For example, as shown, a first slat 110 positioned in a first direction is repositionably connected to a plurality of slats 120, 130, 140, 150, 160 oriented in the second direction at five different hinged and spaced-apart points along the length of the first slat 110. Stated differently, the various slats 110, 120, 130, 140, 150, 160, etc. are repositionably hinged together in diagonally opposed directions, thereby forming a crisscross pattern when the fire fence device is in a fully deployed or expanded condition, as best shown in FIGS. 1-3.

The slats of the fire fence 100 form a lattice design in an expanded form. The lattice design is comprised of diagonal slats 110, 120, 130, 140, 150, 160, etc. that are arranged in a crisscross pattern. The crisscross pattern creates square, rectangular or other geometrically-shaped openings 162 that are each defined by four slats and their four respective hinged points. The hinged points are preferably located near the top end, bottom end and along the entire length of each slat. The geometrically-shaped openings 162 also enhance air circulation and visibility of the campfire, bonfire or any other similar outdoor fire structure, but are not large enough for an individual or pet to pass through.

The plurality of slats 110, 120, 130, 140, 150, 160, etc. are dimensioned in two different directions, wherein a first set of slats remain substantially parallel to one another at all times and a second set of slats remains substantially parallel to one another at all times as well as to the first set of slats when the device 100 is in a fully closed or stowed position, as best shown in FIG. 5. However, when the fire fence device 100 is in a fully deployed position, as best shown in FIGS. 1-3, the first set of slats are diagonally opposed to the second set of slats to form the generally crisscross pattern. For example, the first set of slats 110 may be right-inclining members and the second set of slats 120, 130, 140, 150, 160 may be left-inclining members, wherein each right-inclining member crosses at least two left-inclining members when the device 100 is in the expanded position.

Figure 2:
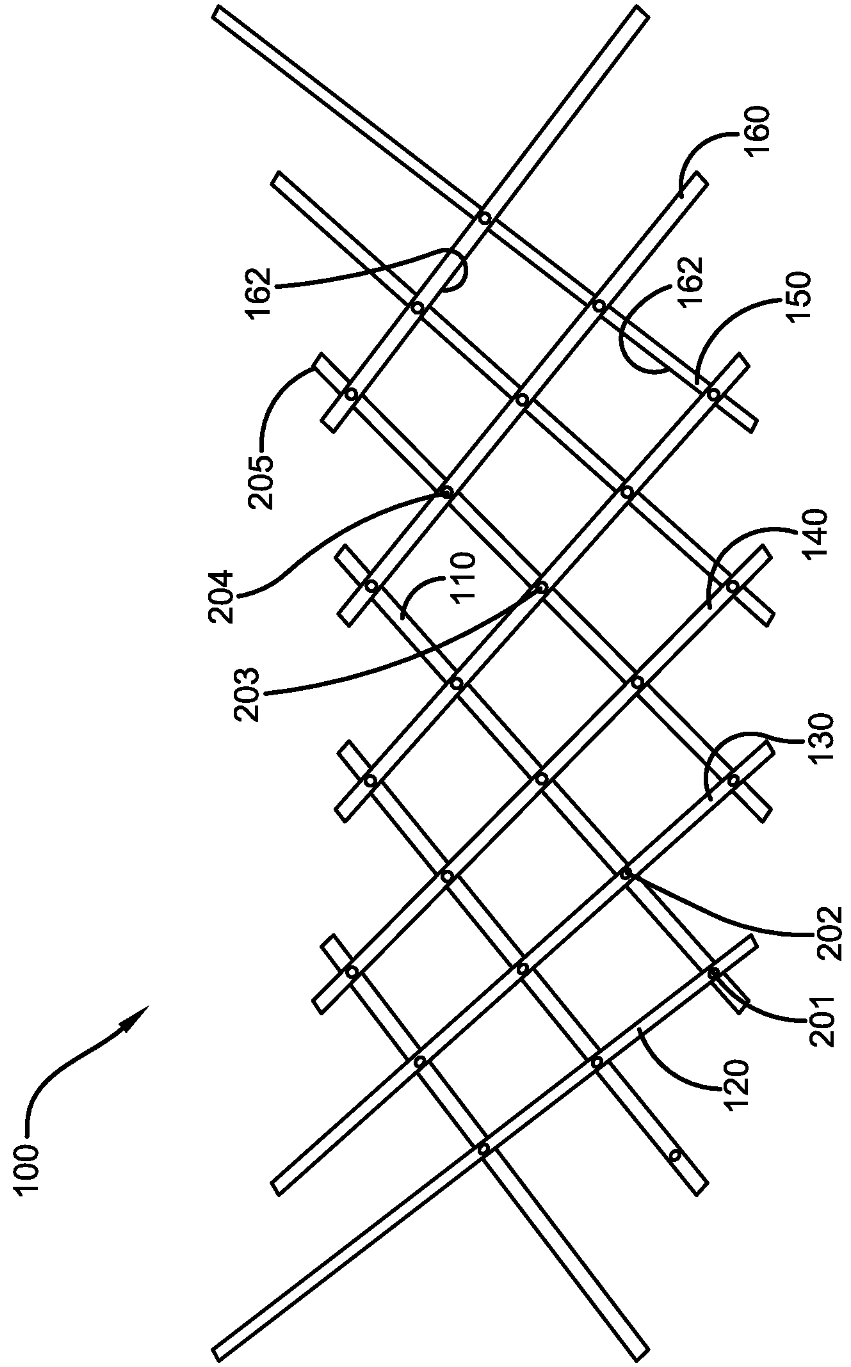
FIG. 2 illustrates a close-up and partial perspective view of one potential embodiment of the fire fence device of the present invention in an expanded condition in accordance with the disclosed architecture, wherein the hinged connection of the plurality of slats via the hinged connectors is on full display.

FIG. 2 illustrates a close-up and partial perspective view of one potential embodiment of the fire fence device 100 of the present invention in an expanded condition in accordance with the disclosed architecture, wherein the hinged connection of the plurality of slats 110, 120, 130, 140, 150, 160, etc. via the hinged connectors 201, 202, 203, 204, 205, etc. is on full display. As stated earlier, each slat is preferably connected to at least five other slats in a zig-zag or crisscross manner. More specifically, the first slat 110 has a bottom hinge 201 located near the bottom end of the slat 110, a plurality of additional hinges 202, 203, 204 along the length of the first slat 110, and a top hinge 205 near the top end of the slat 110. Each of the respective hinges 201, 202, 203, 204, 205 is used to repositionably connect an additional slat to the first slat 110. Each of the additional slats 120, 130, 140, 150, 160 connected to the first slat 110 are diagonally opposite in direction from the first slat 110, and are repositionable to expand or contract the fire fence device 100.

By way of further explanation, a first diagonally opposed slat 120 is repositionably connected to the first slat 110 at the bottom hinge 201, a second diagonally opposed slat 130 is repositionably connected to the first slat 110 at the second hinge 202, a third diagonally opposed slat 140 is repositionably connected to the first slat 110 at the third hinge 203, a fourth diagonally opposed slat 150 is repositionably connected to the first slat 110 at the fourth hinge 204, and a fifth diagonally opposed slat 160 is repositionably connected to the first slat 110 at the top hinge 205.

It should also be appreciated that based on the length of the various slats which may vary to suit user need and/or preference, the number of hingedly-connected slats with each slat may be less or more. For example, in one embodiment, the number of hingedly-connected slats may be three, four, six, seven or any other suitable number, provided that each of the diagonally opposed and interconnected slats are repositionable to expand or contract the fire fence device 100 of the present invention.

FIG. 3 illustrates a perspective view of one potential embodiment of the fire fence device 100 of the present invention in an expanded condition around a campfire 300 in accordance with the disclosed architecture. As shown, a campfire or bonfire 300 is built on the ground 310 in an outdoor environment using wooden sticks and other material. Once the fire 300 has been established, a user can expand the fence 100 into a generally circular configuration around the fire 300 to create a temporary boundary to prevent individuals and pets from getting too close to the fire 300. In an expanded condition, the slats 110, 120, 130, 140, 150, 160, etc. are stretched outwardly to expand the crisscross pattern of the lattice design of the fence 100 and increase its diameter. As stated above, when in expanded condition, the crisscross patterns create geometric spaces or openings 162 that enhance air circulation and visibility of the campfire, bonfire or any other similar outdoor fire structure 300.

The fire fence device 100 forms a periphery around the bonfire 300, thereby dividing the ground 310 into an inner region 302 where the fire 300 is located and an outer region 304. The fire fence 100 prevents children, adults, pets and others from entering the inner region 302 that comprises the bonfire 300, thereby protecting those individuals and pets from getting too close to the fire 300 and becoming injured or burned. Nonetheless, the outer region 304 remains easily accessible to the individuals and pets such that they can sit or walk around in the outer region 304, to enjoy the fire 300. When in its expanded form, the various slats and the fence 100 itself are in a relatively stable position, and will not easily collapse or retract.

Figure 4:
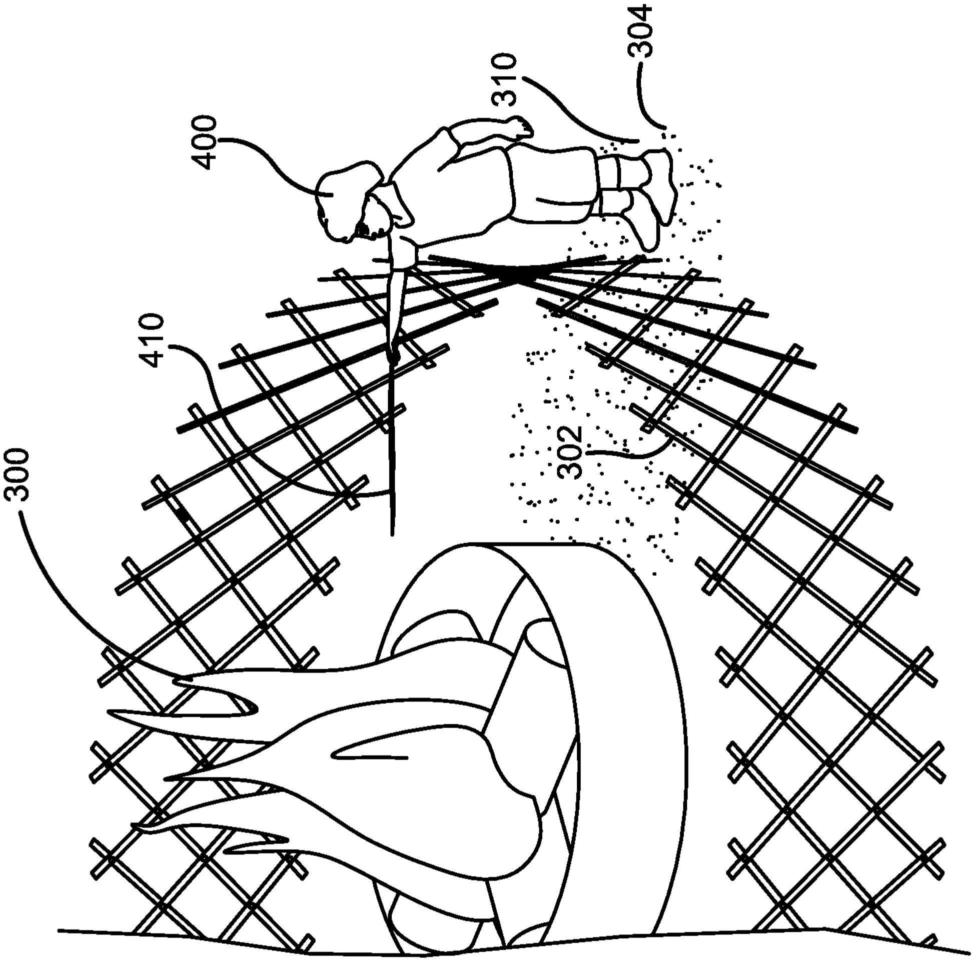
FIG. 4 illustrates a perspective view of one potential embodiment of the fire fence device of the present invention in an expanded condition around a campfire in accordance with the disclosed architecture, wherein the fire fence device is preventing a young child from getting too close to the campfire.

FIG. 4 illustrates a perspective view of one potential embodiment of the fire fence device 100 of the present invention in an expanded condition around a campfire 300 in accordance with the disclosed architecture, wherein the fire fence device 100 is preventing a young child 400 from getting too close to the campfire 300. As shown and previously stated, the fire fence 100 of the present invention may be used to establish a safe perimeter around a campfire or bonfire. A user 400 may enjoy the bonfire 300 from the outside areas 304 demarcated by the fire fence 100 which acts as a barrier for the user 400 and prevents the same from getting too close to the bonfire or campfire 300 located in the inner area 302.

Though it is an effective safe distancing barrier, the fire fence 100 should not be so restrictive that the user 400 cannot place additional wood 410 onto the campfire 300 while positioned in the exterior area 304. It should be appreciated that the fire fence 100 of the present invention may come in different sizes and have slats of different lengths for users to enjoy a campfire or bonfire 300. The various slats are preferably equally spaced-apart to form relatively uniform square, rectangular, diamond or other geometrically-shaped spaces or openings 162 between the hinged slats for comfortable viewing of the campfire 300 while sitting and also providing air ventilation.

FIG. 5 illustrates a perspective view of one potential embodiment of the fire fence device 100 of the present invention in a fully retracted or stowed condition in accordance with the disclosed architecture. In the stowed position, each of the slats 110, 120, 130, 140, 150, 160, etc. touches the respective slats on either side, and all of the slats 110, 120, 130, 140, 150, 160 are substantially parallel to one another and generally vertical in relation to the ground 310. More specifically, the individual slats which were in two diagonally opposite directions when in the expanded condition, retract and come together to become substantially vertical to form a tight cylinder which may be secured via a strap 502 for easy storage and transportation of the fire fence device 100. In this configuration, the fire fence device is free-standing on a relatively flat surface 310.

The individual slats are snapped together in order to be expandable or retractable. In one embodiment, each slat may be approximately 31 inches in length. Alternatively, each slat may be in the range of two to five feet, for example. The fire fence 100 in retracted position is easy to transport in a pickup truck, SUV or van. The lattice-style fire fence 100 of the present invention offers a unique pattern that is appealing to individuals and that may be relatively easily repositioned between a deployed and a stowed position. The fire fence 100 is configured as a lattice structure and consists of relatively thin diagonal slats that are arranged in a crisscross pattern, thereby forming geometric openings 162. The point of contact between the various slats may be hinged using a hinge pin, which can be a round-headed semi-tube rivet of zinc-plated mild steel, or any nail or other similar structure or fastener.

Returning now to FIG. 1, in a preferred embodiment, the fire fence device 100 further comprises a plurality of additional safety features that alert the user and other individuals when the fire fence device 100 has been disturbed or otherwise breached. More specifically, the fire fence device 100 may comprise one or more sensors 170, a wireless communication module 172, a speaker 174, and a battery 176 for powering each of the sensors 170, the wireless communication module 172 and the speaker 174. The sensors 170 may be capable of detecting a variety of parameters such as, but not limited to, temperature, motion and whether the fire fence device 100 has been repositioned, disturbed or otherwise breached, and is in electrical communication with the speaker 174 and/or the wireless communication module 172. For example, if one or more of such parameters have been detected, the fire fence device 100 may emit an audible alarm via the speaker 174 to warn the user 400 of the same, and/or utilize the wireless communication module 172 to send a wireless communication to a mobile application 180 installed on the user's electronic device 182. The wireless communication module 172 can be a Wi-Fi/Bluetooth SoC embedded in the fire fence device 100, though the use of other wireless technologies is also contemplated including, but not limited to, RFID, NFC, 4G/5G/LTE, etc. Further, the wireless communication module 172 establishes a wireless connection with the electronic device 182, such as a smartphone, smart watch, tablet, computer, server, etc., and is capable of alerting the user as needed via the mobile application installed thereon.

While the fence device is preferably comprised of a battery 176, other power sources are also contemplated such as, but not limited to, a solar panel, photovoltaic panel or any other suitable power source. If a battery 176 is used, it may be a disposable battery or a rechargeable battery, and may be easily replaced or removed if necessary for recharging. Suitable batteries include alkaline, nickel-cadmium, nickel-metal hydride, etc. Throughout this specification the terms "battery" and "batteries" may be used interchangeably to refer to one or more wet or dry cells or batteries of cells in which chemical energy is converted into electricity and used as a source of DC power. References to recharging or replacing batteries may refer to recharging or replacing individual cells, individual batteries of cells or a package of multiple battery cells as is appropriate for any given battery technology that may be used.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "fire fence", "fence", "expandable and collapsible fence", "portable fence system" and "barrier apparatus" are interchangeable and refer to the fire fence 100 of the present invention.

Notwithstanding the forgoing, the fire fence 100 of the present invention can be of any suitable size and configuration as is known in the art without affecting the overall concept of the invention, provided that it accomplishes the above-stated objectives. One of ordinary skill in the art will appreciate that the size, configuration and material of the fire fence 100 as shown in the FIGS. are for illustrative purposes only, and that many other sizes and shapes of the fire fence 100 are well within the scope of the present disclosure. Although the dimensions of the fire fence 100 are important design parameters for user convenience, the fire fence 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A fire protective barrier for surrounding a campfire or bonfire, comprising:

a first plurality of parallel right-inclining slats;

a second plurality of parallel left-inclining slats positioned diagonally opposite the first plurality of slats and forming a retractable lattice structure therewith;

a plurality of fasteners pivotably connecting the first plurality of slats to the second plurality of slats at the lattice intersection points between the first and second plurality of slats;

wherein the barrier is repositionable between a freestanding fully-deployed expanded position and a retracted position via pivoting of the slats about the fasteners;

wherein the first plurality of slats are diagonally opposed to the second plurality of slats and the first and the second plurality of slats form a plurality of continuous openings in the barrier when the barrier is in the freestanding fully-deployed expanded position; and wherein each of the first plurality of slats are substantially parallel to each of the second plurality of slats when the barrier is in the retracted position;

a temperature sensor and a motion sensor each disposed on one of the slats configured to detect the campfire or bonfire temperature and if the barrier has been moved or repositioned;

a speaker disposed on one of the slats configured to sound an alarm when the sensors detect that the barrier has been moved or repositioned;

a rechargeable battery for powering the sensors and the speaker; and a securing strap which wraps around and retains the barrier in the retracted position; and wherein the first and second plurality of slats are formed of a heat-resistant polymer material and coated with a sunlight-resistant material.

2. The fire protective barrier as recited in claim 1, wherein a diameter of the fire protective barrier is larger in the freestanding fully deployed position than in the retracted position.

3. The fire protective barrier as recited in claim 2, wherein each slat in the first plurality of slats is hingedly connected to at least three slats in the second plurality of slats.

4. The fire protective barrier as recited in claim 1, wherein the plurality of fasteners comprise round-headed semi-tube rivets formed of zinc-plated mild steel material.

5. A fire protective barrier for surrounding a campfire or bonfire, comprising:

a first plurality of parallel right-inclining slats;

a second plurality of parallel left-inclining slats positioned diagonally opposite the first plurality of slats and forming a retractable lattice structure therewith;

a plurality of fasteners pivotably connecting the first plurality of slats to the second plurality of slats at the lattice intersection points between the first and second plurality of slats;

wherein the barrier is repositionable between a freestanding fully-deployed expanded position and a retracted position via pivoting of the slats about the fasteners;

wherein the first plurality of slats are diagonally opposed to the second plurality of slats and the first and the second plurality of slats form a plurality of continuous openings in the barrier when the barrier is in the freestanding fully-deployed expanded position; and wherein each of the first plurality of slats are substantially parallel to each of the second plurality of slats when the barrier is in the retracted position;

a temperature sensor disposed on one of the slats configured to detect the campfire or bonfire temperature;

a motion sensor disposed on one of the slats configured to detect if the fire protective barrier has been moved or repositioned;

a speaker disposed on one of the slats configured to sound an alarm when the sensors detect that the barrier has been moved or repositioned;

a wireless communication module in wireless communication with a mobile application installed on a remote electronic device; and a solar powered rechargeable battery for powering the sensors, the speaker and the wireless communication module;

wherein the motion sensor is configured to communicate an alert to the speaker and the wireless communication module that the barrier has been moved or repositioned.

6. The fire protective barrier as recited in claim 5, wherein the plurality of fasteners comprise round-headed semi-tube rivets formed of zinc-plated mild steel material.

* * * * *